Nov. 12, 1935.   C. R. McCULLOUGH   2,021,012
PROCESS FOR PRODUCTION OF ACID ALKALI METAL PYROPHOSPHATES
Filed Oct. 27, 1932
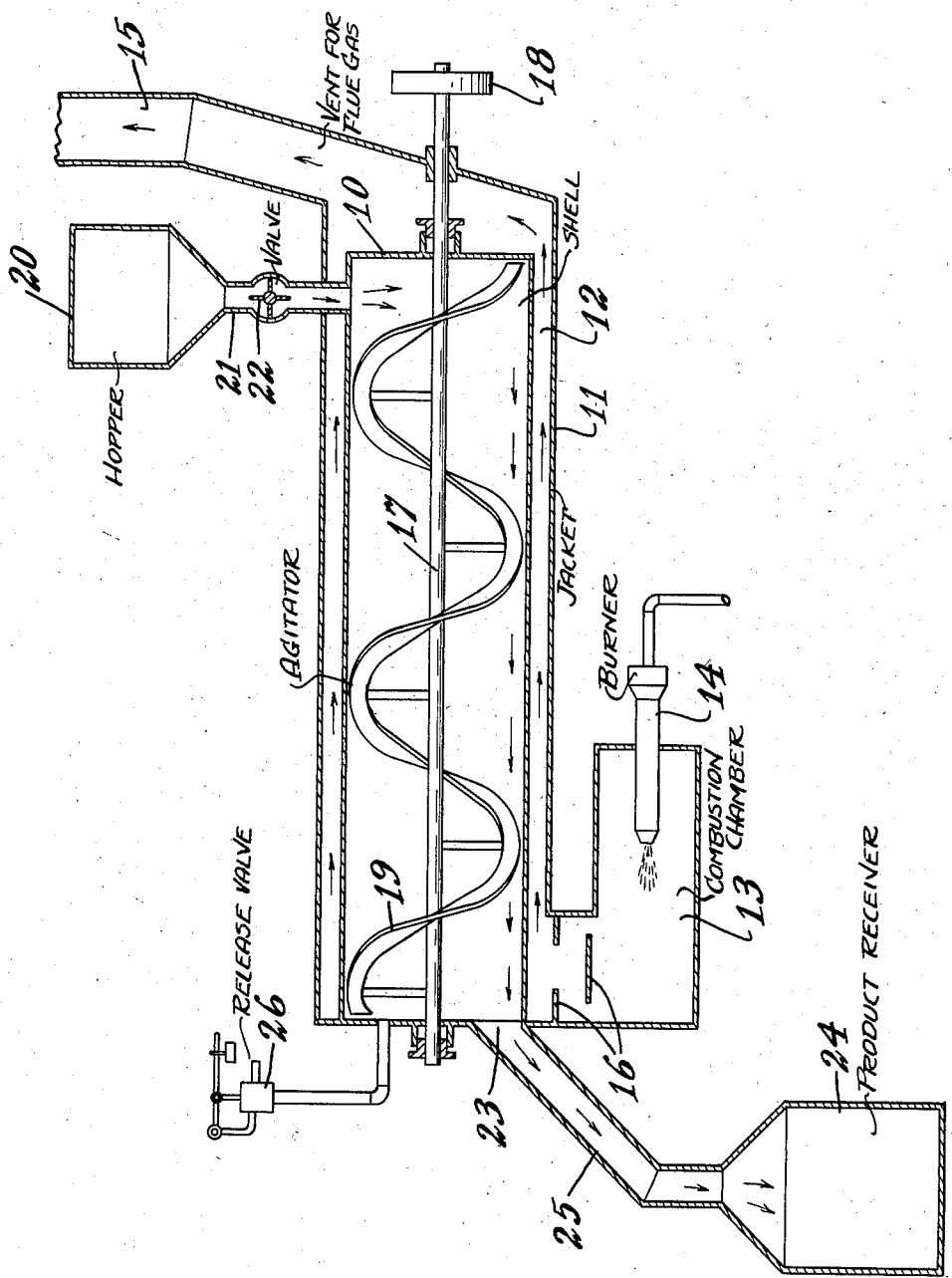
INVENTOR
C. R. McCullough
BY
Herbert J Krase
ATTORNEY Patented Nov. 12, 1935

2,021,012

UNITED STATES PATENT OFFICE 2,021,012

PROCESS FOR PRODUCTION OF ACID ALKALI-METAL PYROPHOSPHATES

Campbell R. McCullough, Anniston, Ala., assignor to Swann Research, Incorporated, a corporation of Alabama Application October 27, 1932, Serial No. 639,758

3 Claims. (Cl. 23—107)

This invention relates to a process for the production of acid alkali-metal pyrophosphate.

One object of this invention is the provision of a process for cheaply producing pure acid alkali-metal pyrophosphates. Another object is the provision of a process for the production of acid alkali-metal pyrophosphates, particularly the acid sodium and potassium pyrophosphates which are free from the corresponding metaphosphates. Other objects and advantages will become apparent as the disclosure proceeds.

Acid sodium pyrophosphate is now largely used as a source of the acid ingredient in baking powders, baking mixtures or the like leavening agents; and acid potassium pyrophosphate gives promise of being so used in the future because of the absence of a bitter taste in baked goods. Besides supplying the acid ingredient, another characteristic inherent in this material is the delayed action, when compared, for example, with other acid phosphates such as mono sodium orthophosphate and acid calcium phosphate.

In previous methods for making the acid sodium pyrophosphate it has been the practice to heat mono sodium orthophosphate in shallow pans without agitation to temperatures in the neighborhood of 460° F. (238° C.) for periods of time ranging from 8 hours to as much as 24 to 30 hours, until the maximum conversion had been obtained. The completion of the conversion was recognized by the appearance of the heated salt. However, altho skilled operators were able to distinguish fairly well the completion of the reaction, the product thus obtained always contained an appreciable amount of sodium metaphosphate, varying from 0.4% to several percent by weight.

Due to the unknown physiological action of sodium or potassium metaphosphate on the human organism, it became desirable to devise a process by which the metaphosphate content of the pyrophosphates used for human consumption be decreased as much as practical, and if possible, eliminated entirely. A further advantage of the purer product is the higher neutralizing value of the pyrophosphate, due to the absence of the metaphosphate.

I have now discovered that if a monobasic alkali orthophosphate such as monosodium or mono potassium orthophosphate be heated to a temperature at which pyrophosphate and metaphosphate will form, that it is possible to control the amount of such metaphosphate formed during heating by controlling the pressure of water vapor in the atmosphere in which the salt is heated. I have been led to this discovery as a result of my earlier discovery that the metaphosphate forming reaction is a reversible one. As a result of these discoveries the following advantages in manufacture result from my improved process:—

1. The product obtained thereby is substantially free from metaphosphate.

2. The process can be continuously and rapidly carried out. As an example, the old process required from 8 to as much as 30 hours for conversion of a quantity of salt. My new process requires, on the average, 30 minutes for the reaction, and yields an improved product.

3. The product, due to the ease of control of the process, is more uniform in composition.

4. The product is of such a nature that it is more easily ground.

5. The process is simpler to control.

6. Better utilization of heat is obtained.

Reference is made to the accompanying drawing forming a part of this application, the single figure of which illustrates one method by which my improved process may be carried out.

In the drawing, which illustrates diagrammatically an apparatus for carrying out my process, 10 is a cylindrical metallic shell provided with a jacket 11 inclosing an annular space 12 about the shell 10 and thru which passes heated gas supplied from a combustion chamber 13 and burner 14, the gas being exhausted by a flue 15. Baffles 16 prevent radiation from the flame of the burner 14 impinging directly upon the shell 10 and also provide a more uniform gas temperature in the annular space 12. A centrally located shaft 17 driven by a pulley 18 is positioned within the shell 10 and has mounted thereon a helical ribbon agitator 19. A hopper 20 is provided connected with one end of the shell 10 by a conduit 21, in which is placed a suitable control valve 22. At the other end of shell 10 is located an exit 23 connected with a receiver 24 by a conduit 25. Rotation of the shaft 17 and helical ribbon 19 is effected in a direction so as to move material within shell 10 from feed to discharge end as indicated by the arrows.

To one end of the shell 10, and communicating with its interior, a pressure responsive device 25 is attached to serve as a discharge for the liberated water vapor; this may consist of an ordinary weight or spring loaded safety valve.

While I have described but one embodiment of the apparatus in which my process may be successfully carried out, it will be apparent that other forms of apparatus, employing the features disclosed, may be used. These features are a combination of means for introducing a flow of salt into a suitably heated container, means therein for agitating the salt during the heating, and means for regulating and controlling the partial pressure of the water vapor generated during the heating.

In carrying out my process for the production of acid sodium pyrophosphate, monosodium phosphate, $NaH_2PO_4$ or the hydrated salt is placed in the hopper 20, the temperature of the gas in the annular space 12 is raised to the neighborhood of 270° to 290° C. by means of gas burner 14. The shaft 17 carrying the helical conveyor 19 is then started rotating. The crystals of monosodium phosphate are now admitted to the shell 10 at a proper rate of flow by suitably manipulating rotary valve 22. Since the pyrophosphate forming reaction results in heat absorption and water evolution, the temperature of the gases in the annular space 12 may be raised above the 270° to 290° C. limit, to as high as 310° C. or higher, the temperature being regulated so that the final temperature of the salt undergoing conversion is in the neighborhood of 270° to 290° C. In order to prevent caking of the orthophosphate just after it has been admitted to the interior of the shell 10, the initial temperature is preferably maintained in the neighborhood of 200° C., the final temperature of the converted salt being in the neighborhood of 290° C. Such a temperature difference can be readily obtained by employing a gas flow counter current to the travel of the salt, as shown.

During operation, if the final salt temperature, for example, is 290° C., it is necessary—in order to prevent the formation of metaphosphate—to maintain a partial pressure of water vapor equal to or above 960 mm. pressure. This is accomplished by maintaining the pressure within shell 10 by means of the pressure responsive device 26 at a pressure equal to or above this value. In the same manner, if a lower salt temperature is employed, a lower corresponding pressure may be utilized. The temperatures and corresponding water vapor partial pressures below which it is undesirable to go are given for a few temperatures, as follows:—

| Maximum temperature of salt, °C. | Lowest permissible water vapor pressure in millimeters of Hg for sodium pyrophosphate |
|---|---|
| 260 | 290 |
| 270 | 440 |
| 280 | 650 |
| 290 | 960 |

I have been able to express the relation between the temperature of the sodium salt undergoing conversion and the partial water vapor pressure by means of the following equation, which I believe to be valid within the working range of the process, namely, between 190° C. and 310° C. (463° to 583° C. absolute:—

$$\text{Log } p = \frac{-5263}{T} + 12.32$$

where $p$ is the pressure in millimeters of Hg of the water vapor and T is the temperature on the absolute centigrade scale.

This formula, while not yielding the exact numerical values of the above table, will give values differing from the above by less than 10%, which is believed sufficiently exact for the commercial control of my process.

This equation enables one skilled in the art to determine the minimum pressure to be applied to the salt undergoing conversion and thereby substantially prevent the formation of metaphosphate in the product.

The maximum desirable pressure of the water vapor is from 0 to 5 pounds gauge pressure above the minimum pressure determined as above. Because of the difficulty of feeding the monosodium orthophosphate into the conversion apparatus against a high pressure, it is desirable to choose the temperature of conversion so that the total pressure within the apparatus is at substantially atmospheric pressure. This temperature, below which it is desirable to operate, is about 285° C. By choosing a temperature below 285° C., say 280° C., it will be possible to operate my process at substantially atmospheric pressure, permitting water to escape freely as steam through the pressure responsive device 26, which in this specific case operates without imposing any pressure whatever on the discharging vapor.

It should not be supposed, however, that my process is limited to operation at atmospheric pressure. It may be possible in certain cases to considerably increase the rate of production by operating at higher temperatures than those mentioned. By applying a positive pressure, as by a gas on the surface of the monosodium phosphate in hopper 20, the difficulty of feeding the salt into the converter against the positive vapor pressure may be overcome. Other means for accomplishing the same end will be apparent to those skilled in the art.

The acid alkali-metal pyrophosphate produced by my process, being formed from a mass of salt undergoing agitation, is of a friable nature which lends itself readily to reduction to a powder in mills of known type.

The data presented above are specifically applicable to the manufacture of the acid sodium pyrophosphate; however, the principle embodied in my invention may be applied to other alkali-metal pyrophosphates such as potassium, lithium, rubidium or caesium.

While I have described only one embodiment of my invention, it will be apparent to those skilled in the art that it is not so limited, but that it is susceptible of various changes and modifications without departing from the spirit thereof, and I desire that only such limitations shall be placed thereupon as may be imposed by the prior art, or as are specifically set forth in the appended claims.

I claim:

1. Process for the production of acid sodium pyrophosphate comprising heating mono sodium orthophosphate to a temperature above 284° C. and at which substantially complete conversion to pyrophosphate will take place and in an atmosphere comprising water vapor of such concentration that the partial pressure of such water vapor is greater than atmospheric pressure and greater than that expressed by the relation:—

$$\text{Log } p = \frac{-5263}{T} + 12.32$$

where $p$ is the partial pressure of said water vapor in millimeters of mercury and T is said temperature of heating expressed in absolute degrees centigrade.

2. Process for the production of acid sodium pyrophosphate, comprising heating monosodium orthophosphate at a temperature between 284° C. and 310° C. and in the presence of an atmosphere of water vapor of such concentration that the partial pressure of said vapor is greater than atmospheric pressure and greater than that expressed by the relation:—

$$\text{Log } p = \frac{-5263}{T} + 12.32$$

where $p$ is the partial pressure of said vapor in millimeters of Hg and $T$ is the absolute temperature in degrees centigrade.

3. Process for the production of acid sodium pyrophosphate comprising heating, with agitation, mono sodium orthophosphate to a temperature between 284° C. and 310° C. at which substantially complete conversion to pyrosodium phosphate will take place and in an atmosphere comprising water vapor of such concentration that the partial pressure of said vapor is greater than atmospheric pressure and greater than that expressed by the relation:—

$$\text{Log } p = \frac{-5263}{T} + 12.32$$

where $p$ is the partial pressure of said water vapor in millimeters of Hg and $T$ is the absolute temperature in degrees centigrade.

CAMPBELL R. McCULLOUGH.